(12) United States Patent
Kwon et al.

(10) Patent No.: US 8,681,765 B2
(45) Date of Patent: Mar. 25, 2014

(54) METHOD AND APPARATUS OF CONTROLLING ACCESS MODE FOR COMMUNICATION SYSTEM USING SHARED OR UNLICENSED BAND

(75) Inventors: Tae Soo Kwon, Hwaseong-si (KR); Hyo Sun Hwang, Seoul (KR); Kyung Hun Jang, Suwon-si (KR); Hyun Ho Choi, Yongin-si (KR); Tae Jin Lee, Suwon-si (KR)

(73) Assignees: Samsung Electronics Co., Ltd., Suwon-si (KR); Sungkyunkwan University Foundation for Corporate Collaboration, Suwon-si (KR)

( * ) Notice: Subject to any disclaimer, the term of this patent is extended or adjusted under 35 U.S.C. 154(b) by 1171 days.

(21) Appl. No.: 12/133,469

(22) Filed: Jun. 5, 2008

(65) Prior Publication Data

US 2009/0190566 A1    Jul. 30, 2009

(30) Foreign Application Priority Data

Jan. 30, 2008    (KR) .................. 10-2008-0009754

(51) Int. Cl.
*H04J 3/00*    (2006.01)
*H04B 7/212*    (2006.01)
*H04B 7/00*    (2006.01)

(52) U.S. Cl.
USPC .............. 370/345; 370/310; 370/348

(58) Field of Classification Search
USPC ....................................... 370/345
See application file for complete search history.

(56) References Cited

U.S. PATENT DOCUMENTS

| | | | | |
|---|---|---|---|---|
| 7,310,679 | B1 * | 12/2007 | Doyle | 709/231 |
| 2005/0157678 | A1 * | 7/2005 | Mantha et al. | 370/329 |
| 2006/0002378 | A1 * | 1/2006 | Beach et al. | 370/352 |
| 2006/0160551 | A1 | 7/2006 | Matoba et al. | |
| 2007/0032254 | A1 | 2/2007 | Chen | |
| 2007/0153935 | A1 * | 7/2007 | Yang et al. | 375/267 |
| 2007/0223508 | A1 | 9/2007 | Nandagopalan | |
| 2007/0248086 | A1 * | 10/2007 | Petersen | 370/389 |
| 2009/0046625 | A1 * | 2/2009 | Diener et al. | 370/319 |

FOREIGN PATENT DOCUMENTS

EP    1 641 187    3/2006

\* cited by examiner

*Primary Examiner* — Shripal Khajuria
(74) *Attorney, Agent, or Firm* — NSIP Law

(57) ABSTRACT

A technology that can adaptively control an access mode according to a shared band or an unlicensed band used by an adjacent communication system. An access mode controlling apparatus includes a band recognition unit to recognize a usage rate of an unlicensed band or a shared band that is used by an adjacent communication system of a target communication system; a mode determination unit to determine, as an access mode, any one of a contention access mode and a contention-free access mode, based on the usage rate of the unlicensed band or the shared band; and an information transmitter to transmit mode information associated with the determined access mode to member nodes or a base station of the target communication system.

19 Claims, 8 Drawing Sheets

< WHEN USAGE RATE OF UNLICENSED BAND OR SHARED BAND IS LOW >

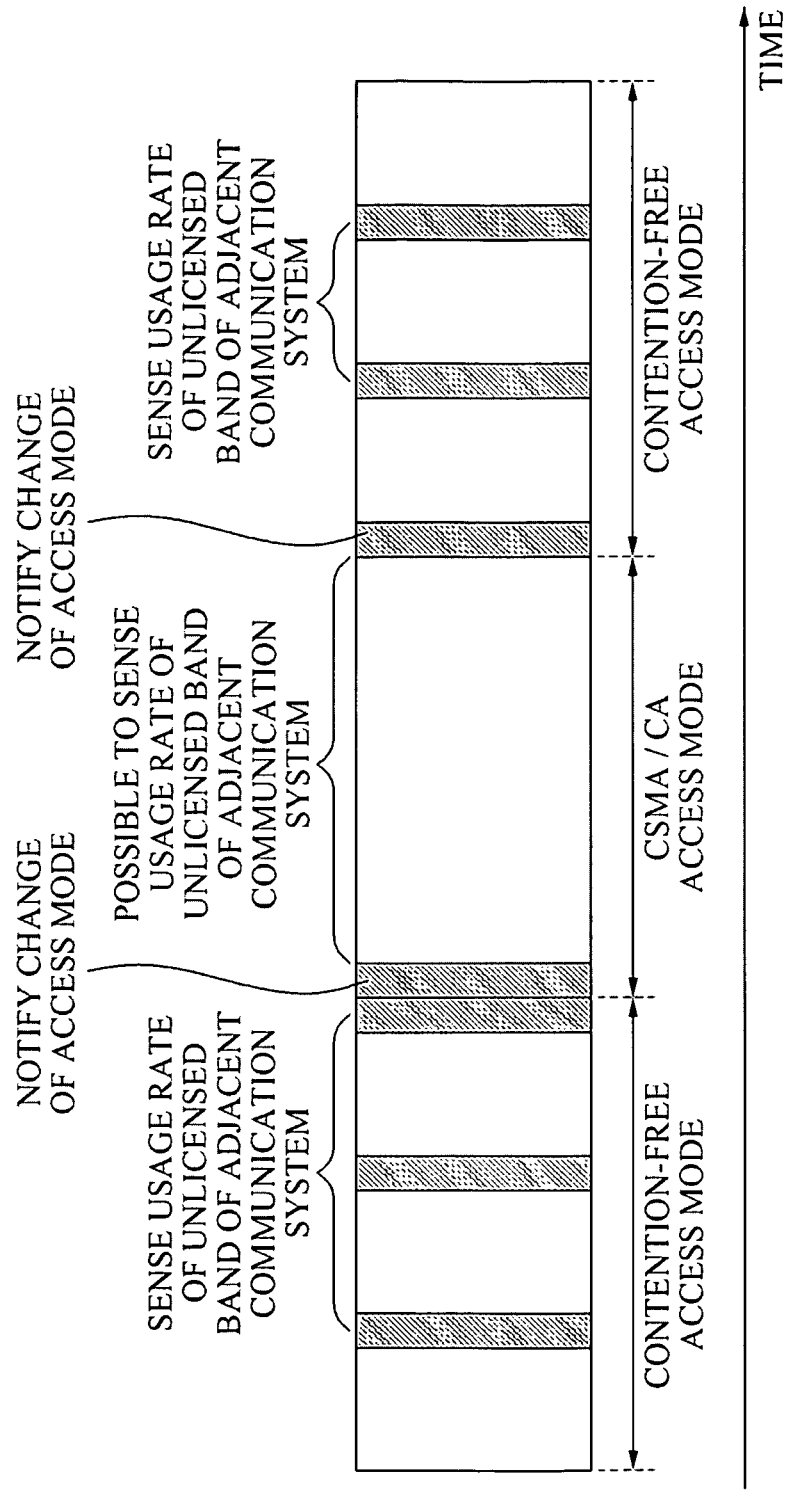

| BAND | MAXIMUM TRANSMISSION POWER | CHANNEL INDEX | CHANNEL INDEX | CHANNEL USAGE RATE (TIME WHEN CHANNEL USER IS DETECTED/ MEASUREMENT (SENSING) TIME) | CHANNEL AVAILABILITY | ACCESS MODE | |
|---|---|---|---|---|---|---|---|
| | | | | | | WHEN CONTENTION-ACCESS MODE IS APPROPRIATE BASED ON LENGTH OF DATA (REFERENCE VALUE 30%) | WHEN CONTENTION-FREE ACCESS MODE IS APPROPRIATE BASED ON LENGTH OF DATA (REFERENCE VALUE 30%) |
| ISM (2.4-2.4835 GHZ) | 1W | 1 | 20MHZ | 20% | AVAILABLE | RANDOM ACCESS MODE | CONTENTION-FREE ACCESS MODE |
| | | 2 | 20MHZ | 0% | AVAILABLE | RANDOM ACCESS MODE | CONTENTION-FREE ACCESS MODE |
| | | 3 | 20MHZ | 40% | AVAILABLE | CSMA/CA MODE | CSMA/CA MODE |
| | | ⋮ | ⋮ | ⋮ | ⋮ | ⋮ | ⋮ |
| | | 13 | 20MHZ | 70% | UNAVAILABLE | - | - |
| ISM (5.725-5.850 GHZ) | 1W | 1 | 20MHZ | 50% | AVAILABLE | CSMA/CA MODE | CSMA/CA MODE |
| | | 2 | 20MHZ | 0% | AVAILABLE | RANDOM ACCESS MODE | CONTENTION-FREE ACCESS MODE |
| | | 3 | 20MHZ | 25% | AVAILABLE | RANDOM ACCESS MODE | CONTENTION-FREE ACCESS MODE |
| | | ⋮ | ⋮ | ⋮ | ⋮ | ⋮ | ⋮ |
| | | 13 | 20MHZ | 40% | AVAILABLE | CSMA/CA MODE | CSMA/CA MODE |

# METHOD AND APPARATUS OF CONTROLLING ACCESS MODE FOR COMMUNICATION SYSTEM USING SHARED OR UNLICENSED BAND

CROSS-REFERENCE TO RELATED APPLICATION

This application claims the benefit of Korean Patent Application No. 2008-9754, filed in the Korean Intellectual Property Office on Jan. 30, 2008, the disclosure of which is incorporated herein by reference.

BACKGROUND OF THE INVENTION

1. Field of the Invention

Aspects of the invention relate to technology that can adaptively control an access mode that is used for uplink communication and downlink communication in a communication system using an unlicensed band or a shared band.

2. Description of the Related Art

As demand for a high speed communication service with excellent quality increases, radio resources available for the communication service are being drained. Frequency resources with good communication efficiency are limited, while communications services requiring frequency resources are on the increase. Accordingly, research regarding cognitive radio technology that can more effectively use radio resources is actively being conducted.

The cognitive radio technology can be applicable to an unlicensed band or a shared band, such as Industrial, Scientific, and Medical (ISM) bands. Although the cognitive radio technology is applied, a secondary system using the cognitive radio technology should prevent collisions with a primary system. When a plurality of secondary systems exists, it may be necessary to improve the usage efficiency of radio resources for the secondary systems. Accordingly, there is a need for technology that can more effectively apply cognitive radio technology to improve the usage efficiency of radio resources.

SUMMARY OF THE INVENTION

According to an aspect of the invention, an apparatus to control an access mode is provided. The apparatus includes a band recognition unit to recognize a usage rate of the unlicensed band or the shared band that is used by an adjacent communication system of a target communication system; and a mode determination unit to determine, as an access mode, any one of a contention access mode and a contention-free access mode, based on the usage rate of the unlicensed band or the shared band.

According to another aspect of the invention, a communication system is provided. The system includes to determine, as an access mode, any one of a contention access mode and a contention-free access mode, based on a usage rate of a shared band or an unlicensed band used by an adjacent communication system, the communication system transmits and receives a signal generated according to a data frame. The data frame includes a contention access slot that is a time slot where the communication system performs communication according to the contention access mode; and a contention-free access slot that is a time slot where the communication system performs communication according to the contention-free access mode.

According to still another aspect of the invention, a terminal device is provided. The terminal device includes an information receiver to receive mode information associated with an access mode from a base station; and a communication performing unit to communicate with the base station according to the access mode that is identified from the mode information.

According to yet another aspect of the invention, a method of controlling an access mode is provided. The method includes recognizing a usage rate of the unlicensed band or the shared band that is used by an adjacent communication system of a target communication system; determining, as an access mode, any one of a contention access mode and a contention-free access mode, based on the usage rate of the unlicensed band or the shared band; and transmitting mode information associated with the determined access mode to member nodes or a base station of the target communication system so as to control the access mode of the target communication system.

According to still another aspect of the invention, a method of operating a terminal device is provided. The method includes receiving mode information associated with an access mode from a base station; and communicating with the base station according to the access mode that is identified from the mode information.

Aspects of the invention provide technology that can adaptively determine an optimized access mode according to the length of a transmission message and a usage rate of an unlicensed band or a shared band that is used by an adjacent communication system. Other aspects of the invention also provide technology that can adaptively determine an optimized access mode to thereby improve the usage efficiency of radio resources.

Additional aspects of the invention also provide technology that can adaptively adjust the length of a contention access slot and a contention-free access slot to thereby dynamically determine an optimized access mode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4 illustrates an example of a data frame and an operation of an access mode controlling apparatus according to an embodiment of the invention;

FIG. 5 is a table stored in a database of an access mode controlling apparatus according to an embodiment of the invention;

DETAILED DESCRIPTION OF THE EMBODIMENTS

Figure 1:
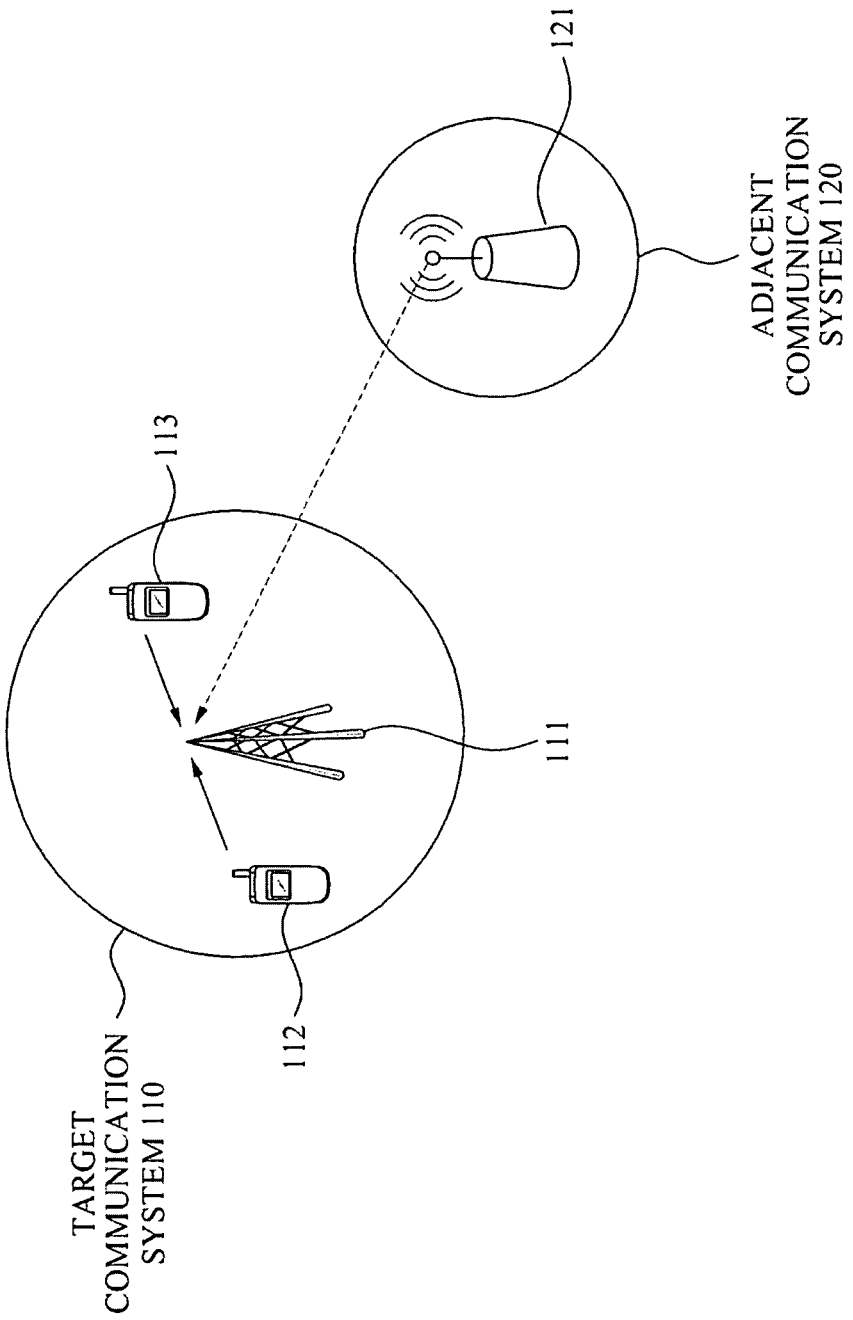
FIG. 1 illustrates a target communication system and an adjacent communication system when the usage rate of an unlicensed band or a shared band is low.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows a target communication system 110 and an adjacent communication system 120 when the usage rate of an unlicensed band or a shared band is low. The target communication system 110 includes a base station 111 and terminals 112 and 113. The adjacent communication system 120 includes an access point 121. Although not required, it is assumed hereinafter that the target communication system 110 and the adjacent communication system 120 use a similar unlicensed band or shared band. The unlicensed band or the shared band may include Industrial, Scientific, and Medical (ISM) bands.

Since any communication system may use the unlicensed band or the shared band, collision may occur between communication systems. When the usage of the unlicensed band or the shared band is not appropriately controlled, the unlicensed band or the shared band may not be used effectively.

As shown in FIG. 1, when only the single adjacent communication system 120 uses the unlicensed band or the shared band with the target communication system 110, a small amount of interference may occur in the base station 111 and the terminals 112 and 113 of the target communication system 110 due to signals from the adjacent communication system 120. Similarly, signals from the target communication system 110 may have a nearly insignificant effect on the access point 121 of the adjacent communication system 120.

When the usage rate of the unlicensed band or the shared band used by the adjacent communication system 120 is low, interference occurring between the target communication system 110 and the adjacent communication system 120 may be insignificant. In these situations, it may be more effective to improve the usage rate of radio resources than to improve communication reliability of the target communication system 110. This is because when the usage rate of the unlicensed band or the shared band is low, communication reliability can be secured to some extent.

Figure 2:
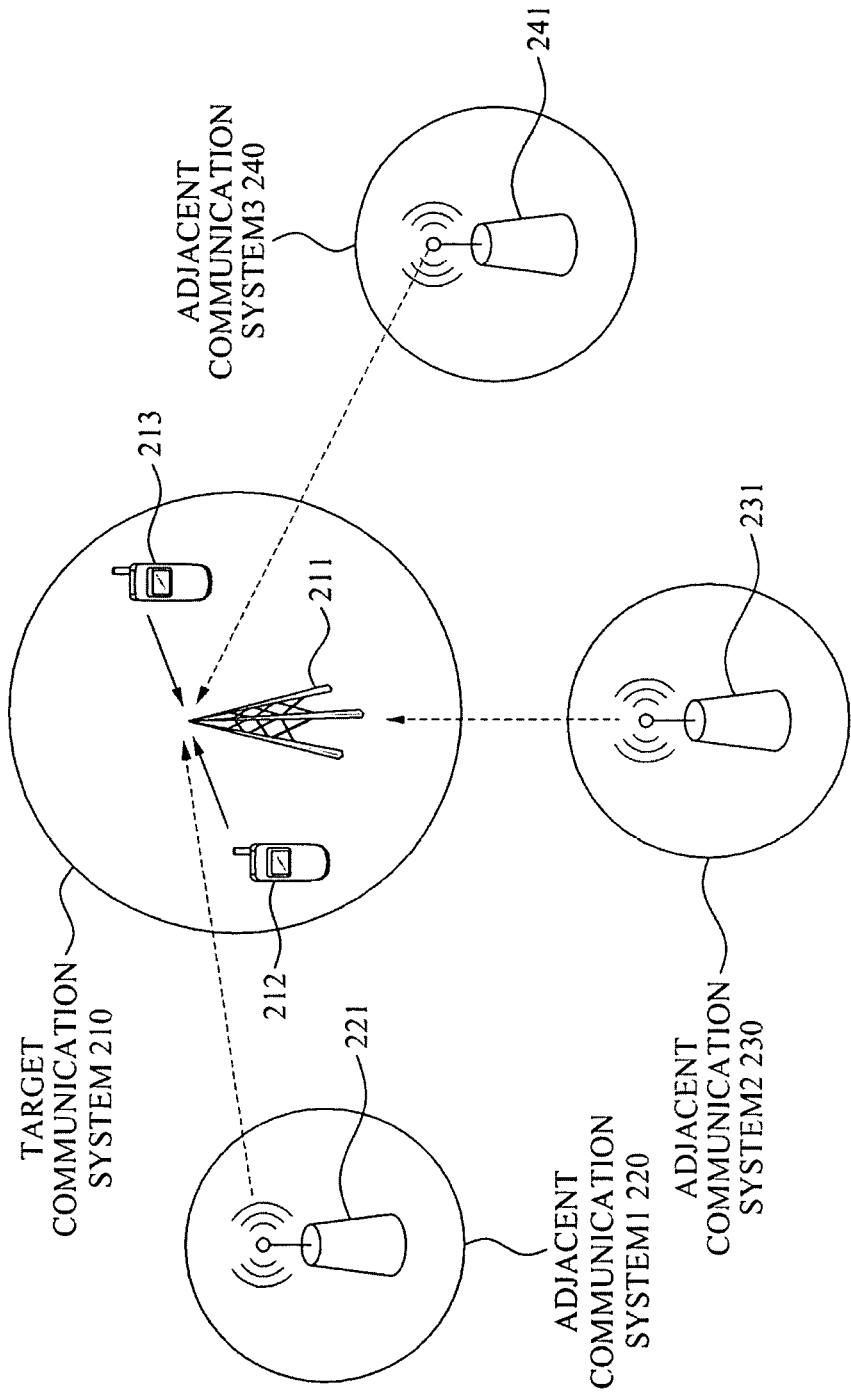
FIG. 2 illustrates a target communication system and an adjacent communication system when the usage rate of an unlicensed band or a shared band is high.

FIG. 2 shows a target communication system 210 and an adjacent communication system when the usage rate of an unlicensed band or a shared band is high. The target communication system 210 includes base station 211 and terminals 212 and 213. An adjacent communication system (1) 220 includes an access point 221, an adjacent communication system (2) 230 includes an access point 231, and an adjacent communication system (3) 240 includes an access point 241.

Although not required, it is assumed hereinafter that the target communication system 210 and the adjacent communication systems 220, 230, and 240 use the same unlicensed band or shared band. As indicated by dotted line in FIG. 2, interference may occur in the target communication system 210 due to signals from the adjacent communication systems 220, 230, and 240. When the plurality of adjacent communication systems 220, 230, and 240 uses the unlicensed band or the shared band too frequently, thereby increasing the usage rate of the unlicensed band or the shared band, the communication reliability of the target communication system 210 may deteriorate. Accordingly, the target communication system 210 should perform communication based on an access mode appropriate for improving the communication reliability.

Referring to FIGS. 1 and 2, when the usage rate of the unlicensed band or the shared band is high, the access mode should be determined to improve the communication reliability. Conversely, when the usage rate of the unlicensed band or shared band is low, the access mode should be determined to improve the usage efficiency of radio resources. The access mode may be generally classified into a contention-free access mode and a contention access mode. The contention access mode may include a random access mode or a Carrier Sense Multiple Access/Collision Avoidance (CSMA/CA) mode.

A communication system according to the contention-free access mode may maximize the usage efficiency of radio resources. In addition, since it is possible to avoid collision that may occur between member nodes belonging to the communication system, data may be stably transmitted and received. Specifically, it is possible to maximize the usage efficiency of radio resources inside the communication system that follows the contention-free access mode, whereas the communication system may monopolize radio resources. Accordingly, it may be difficult to share the radio resources with the adjacent communication system. A communication system that dynamically allocates radio resources may need various control messages to request and allocate the radio resources. Accordingly, overhead may increase on the communication system.

A communication system that follows the random access mode of the contention access mode may immediately transmit and receive data instead of performing a procedure of requesting and allocating the radio resources. The random access mode may be generally used for the initial access or to transmit a relatively small size of message. In the case of the communication system that follows the random access mode, collision may occur between member nodes and it may be difficult to transmit mass message.

A communication system that follows the CSMA/CA mode of the contention access mode may sense a carrier to thereby determine whether radio sources are being used and adjust a sensing wait time based on loads. In the case of the communication that follows the CSMA/CA mode, collisions between member nodes may be prevented to some extent. The communication system that follows the CSMA/CA mode may share radio resources with the adjacent communication system relatively well. Accordingly, the communication system that follows the CSMA/CA mode may have some advantages in securing the communication reliability from the relation with the adjacent communication system. However, in the case of the communication system that follows the CSMA/CA mode, the Media Access Control (MAC) efficiency may be reduced due to unnecessary backoff. When the cell size is large, the CSMA/CA mode may cause collision between data due to inaccurate sensing.

Figure 3:
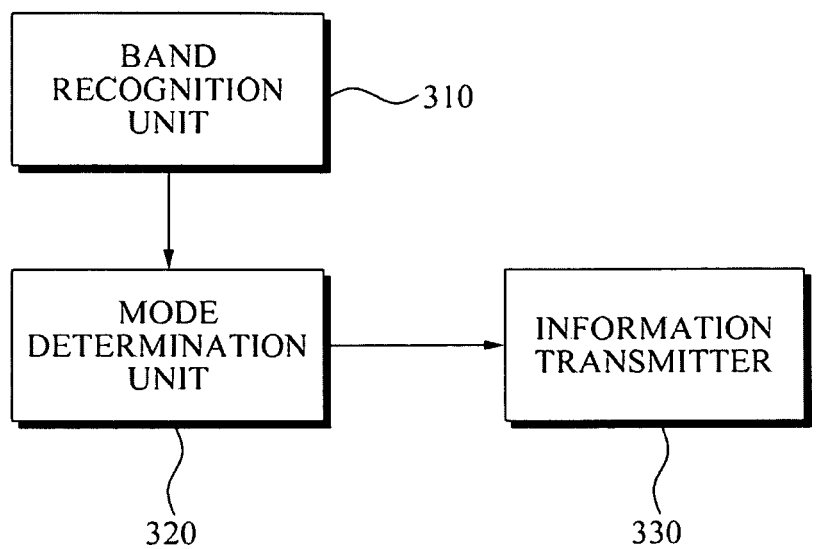
FIG. 3 illustrates an access mode controlling apparatus according to an embodiment of the invention.

FIG. 3 shows an access mode controlling apparatus 300 according to an embodiment of the invention. The access mode controlling apparatus 300 includes a band recognition unit 310, a mode determination unit 320, and an information transmitter 330. According to other aspects of the present invention, the access mode controlling apparatus 300 may include additional and/or different units. Similarly, the functionality of two or more of the above units may be integrated into a single component.

The band recognition unit 310 may recognize a usage rate of an unlicensed band or a shared band that is used by an adjacent communication system of a target communication system. According to an aspect of the invention, the band recognition unit 310 may recognize the usage rate of the unlicensed band or the shared band based on a number of channels that the adjacent communication system uses in the unlicensed band or the shared band, the bandwidth of each channel, a period of time when the adjacent communication system uses the unlicensed band or the shared band, and the like.

In particular, the band recognition unit 310 may directly sense a signal of the adjacent communication system to thereby recognize the usage rate of the unlicensed band or the shared band that is used by the adjacent communication system. The usage rate of the unlicensed band or the shared band may be recognized in such a manner that member nodes of the target communication system sense the signal of the adjacent communication system and the band recognition unit 310 receives the sensing results from the member nodes.

The band recognition unit 310 may determine whether an available band for the target communication system exists between the unlicensed band and the shared band. When the available band does not exist, the band recognition unit 310 may suspend a communication operation. Conversely, when the available band exists, the band recognition unit 310 may perform the communication operation.

The mode determination unit 320 may determine an access mode based on the usage rate of the unlicensed band or the shared band. The access mode may be classified into a contention access mode and a contention-free access mode. The contention access mode may include a random access mode or a CSMA/CA mode.

The mode determination unit 320 may determine the access mode based on the length of a transmission message and a delay requirement of the transmission message, in addition to the usage rate of the unlicensed band or the shared band. For example, when the usage rate of the unlicensed band or the shared band is high, it may be necessary to share radio resources with the adjacent communication system and thereby improve the communication reliability rather than to improve the usage efficiency of radio resources. In this case, the mode determination unit 320 may determine the CSMA/CA as the access mode in order to share the radio resources with the adjacent communication system relatively well.

Conversely, when the usage rate of the unlicensed band or the shared band is low, the mode determination unit 320 may determine whether the random access mode is appropriate for the access mode based on the length of the transmission message, the delay requirement of the transmission message, and the like. When the random access mode is appropriate for the access mode, such as where the length of the transmission message is short, the mode determination unit 320 may determine the random access mode as the access mode. If the random access mode is not appropriate for the access mode, the mode determination unit 320 may determine the contention-free access mode as the access mode to maximize the usage efficiency of radio resources.

Although not shown in FIG. 3, the mode determination unit 320 may include a first determination unit and a second determination unit. The first determination unit may determine whether the random access mode is appropriate for the access mode based on at least one of the length of the transmission message and the delay requirement of the transmission message. The second determination unit may determine, as the access mode, any one of the random access mode, the CSMA/CA mode, and the contention-free access mode based on the usage rate of the unlicensed band or the shared band. According to an aspect of the invention, since an optimal access mode for surrounding communication environments of a target communication system can be adaptively determined based on a usage rate of a unlicensed band or a shared band, it is possible to improve the usage efficiency of radio resources or the communication reliability.

The mode determination unit 320 may determine whether a base station of the target communication system may perform receiving beamforming. When the base station of the target communication system may perform receive beamforming, the mode determination unit 320 may determine the access mode based on an interference cancellation amount caused by the receive beamforming. For example, even when the usage rate of the unlicensed band or the shared band that is used by the adjacent communication system is high, if it is possible to cancel the interference caused by the adjacent communication system through receive beamforming, the mode determination unit 320 may determine the contention-free access mode as the access mode. Although the target communication system uses the contention-free access mode, the interference caused by the adjacent communication system may be cancelled by performing receive beamforming. Accordingly, it is possible to secure the demanded communication reliability. In this case, the mode determination unit 320 may determine the contention-free access mode as the access mode to thereby maximize the usage efficiency of radio resources and secure the communication reliability. The needed communication reliability may be different based on a Quality of Service (QoS) level of the target communication system.

When the access mode is determined in advance, the mode determination unit 320 may adaptively determine whether to change the determined access mode. The band recognition unit 310 may update the usage rate of the unlicensed band or the shared band at least once in a time slot where the target communication system operates in the contention-free access mode or the contention access mode. The mode determination unit 320 may determine whether to change the access mode based on the updated usage rate.

The information transmitter 330 may transmit mode information associated with the determined access mode to member nodes or the base station of the target communication system. The member nodes may communicate with the base station according to the determined access mode that is identified from the mode information. When the access mode is changed while the target communication system is communicating, the information transmitter 330 may transmit the changed access mode to the base station or the member nodes.

FIG. 4 shows an example of a data frame and an operation of an access mode controlling apparatus according to an embodiment of the invention. As shown in FIG. 4, the data frame includes a contention access slot and a contention-free access slot that are time slots. In the contention access slot, the target communication system may perform communication according to a contention access mode, such as a CSMA/CA access mode. In the contention-free access time slot, the target communication system may perform communication according to a contention-free access mode. A start point in time, an end point in time, and the length of each of the contention access slot and the contention-free access slot can be dynamically adjusted. Although not required, it is assumed hereinafter that an access mode controlling apparatus is installed in a base station.

Since a communication system that follows the contention-free access mode allocates radio resources to member nodes, the communication system may not theoretically sense a signal of an adjacent communication system. In a communication system according to an aspect of the invention, an access mode controlling apparatus, such as a base station, may sense the usage rate of the unlicensed band that is used by the adjacent communication system while a communication operation according to the contention-free access mode is being performed. FIG. 4 shows a usage rate of unlicensed band, which is merely for convenience of description. The usage rate of unlicensed band may be easily replaced with the usage of a shared band.

When the usage rate of the unlicensed band or the shared band is relatively high and thus requiring the communication reliability to be secured, the access mode controlling apparatus may determine, as the access mode, the CSMA/CA mode that can share radio resources with the adjacent communication system relatively well. The access mode controlling apparatus may notify member nodes that the access mode is changed.

When the access mode is the CSMA/CA mode, the base station may periodically or non-periodically sense a carrier transmitted from the adjacent communication system. Accordingly, it is possible to sense the usage rate of the unlicensed band or the shared band that is used by the adjacent communication system. The base station may change the access mode from the CSMA/CA mode to the contention-free access mode based on the sensed usage rate. The base station may transmit to the member nodes that the access mode is changed from the CSMA/CA mode to the contention-free access mode.

The base station may sense the usage rate of the unlicensed band or the shared band during a period of time when the base station operates in the contention-free access mode and may adaptively change the access mode. A data frame according to an aspect of the invention may provide the data structure appropriate for a communication system disclosed in this invention. The frame structure may be applied to adaptively adjust the access mode.

FIG. 5 is a table 500 stored in a database of an access mode controlling apparatus according to an embodiment of the invention. Referring to the table 500, an unlicensed band or the shared band includes an ISM band within the range of 2.4 through 2.4835 GHz and an ISM band within the range of 5.725 through 5.850 GHz. The maximum transmission power may be limited to 1 W. Each of the ISM bands may include 13 channels.

The access mode controlling apparatus may recognize a channel usage rate of each channel. The access mode controlling apparatus may determine the channel availability for a target communication system. Specifically, the access mode controlling apparatus may determine a $13^{th}$ channel of the ISM band within the range of 2.4 through 2.4835 GHz as an unavailable channel since the channel usage rate of the $13^{th}$ channel is relatively high.

Generally, an access mode may be classified into a contention access mode and a contention-free access mode. The access mode controlling apparatus may classify the access mode based on the length of a transmission message, that is, data. Although not shown in FIG. 5, the access mode controlling apparatus may further consider QoS levels demanded by terminals, such as a delay requirement.

If the length of the transmission message is relatively short, the contention access mode may be determined as an appropriate access mode. If the length of the transmission message is relatively long, the contention-free access mode may be determined as the appropriate access mode.

When the contention access mode is determined as the appropriate access mode, the access mode controlling apparatus may compare a corresponding channel usage rate with a reference value, for example, 30%. Since the change usage rate of a first channel of the ISM band within the range of 2.4 through 2.4835 GHz is 20% less than the reference value, the access mode controlling apparatus may determine the random access mode of the contention access mode as the access mode. If the channel usage rate is low, it may be more effective to determine the random access mode as the access mode than the CSMA/CA access mode, which has the main purpose to prevent collision with the adjacent communication system. However, the channel usage rate of a third channel of the ISM band within the range of 2.4 through 2.4835 GHz, for example 40%, is greater than the reference value. Accordingly, the access mode controlling apparatus may determine the CSMA/CA access mode as the access mode in order to prevent the collision with the adjacent communication system. Conversely, when the contention-free access mode is determined as the appropriate access mode based on the length of data, the access mode controlling apparatus may compare the channel usage rate of each channel with the reference value, for example, 30%.

Since the channel usage rate of a first channel of the ISM band within the range of 5.725 through 5.850 GHz is 50% greater than the reference value, the access mode controlling apparatus may determine the CSMA/CA mode as the access mode of the first channel in order to prevent collisions with the adjacent communication system. However, the channel usage rate of a second channel of the ISM band within the range of 5.725 through 5.850 GHz is 0% less than the reference value. Accordingly, the access mode controlling apparatus may determine the contention-free access mode as the access mode in order to maximize the usage efficiency of radio resources.

Figure 6:
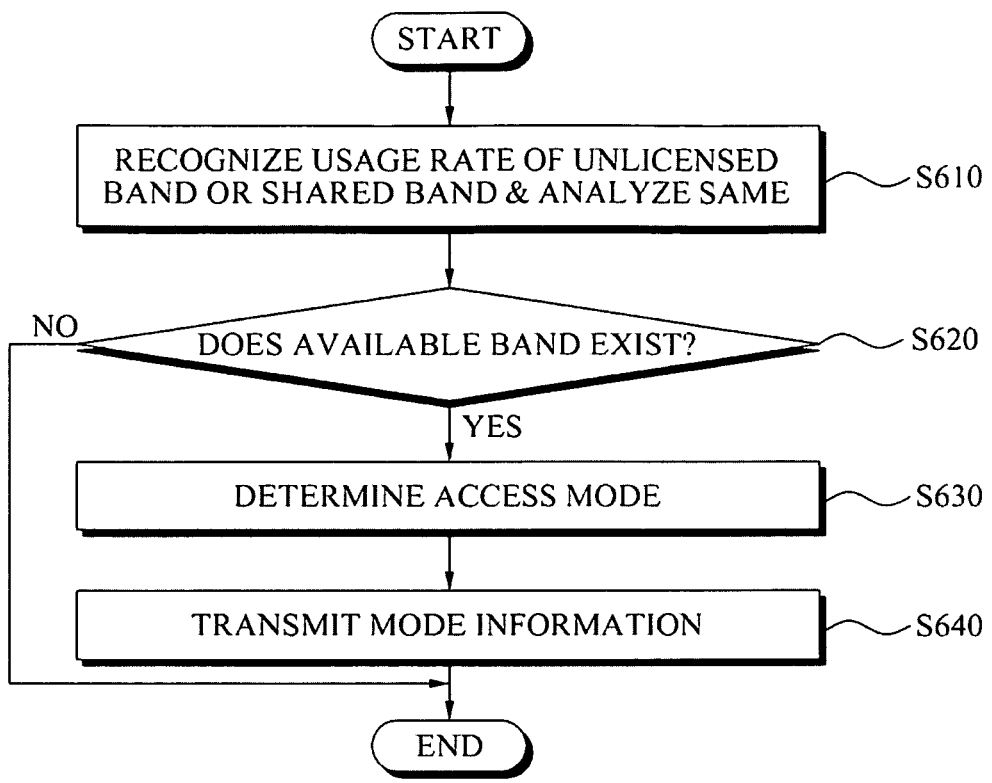
FIG. 6 is a flowchart of a process of controlling an access mode according to an embodiment of the invention.

FIG. 6 is a flowchart of a process of controlling an access mode according to an embodiment of the invention. In operation S610, an access mode controlling apparatus recognizes a usage rate of an unlicensed band or a shared band that is used by an adjacent communication system of a target communication system and analyzes the unlicensed band or the shared band.

In operation S620, the access mode controlling apparatus determines whether an available band exists based on the analysis result regarding the unlicensed band or the shared band. If the available band does not exist, an operation of the access mode controlling apparatus may be terminated and then a subsequent operation will be performed. If the available band exists, operation S630 may be performed. In operation S630, the access mode controlling apparatus determines, as an access mode, any one of a contention access mode and a contention-free access mode, based on the usage rate of the unlicensed band or the shared band. Operation S630 will be described in detail with reference to FIG. 7.

In operation S640, the access mode controlling apparatus transmits mode information associated with the determined access mode to member nodes or a base station of the target communication system. Accordingly, when the access mode is determined or changed, the access mode controlling apparatus may transmit the mode information to the base station or the member nodes, so that the base station and the member nodes may identify the determined or changed access mode from the mode information.

Figure 7:
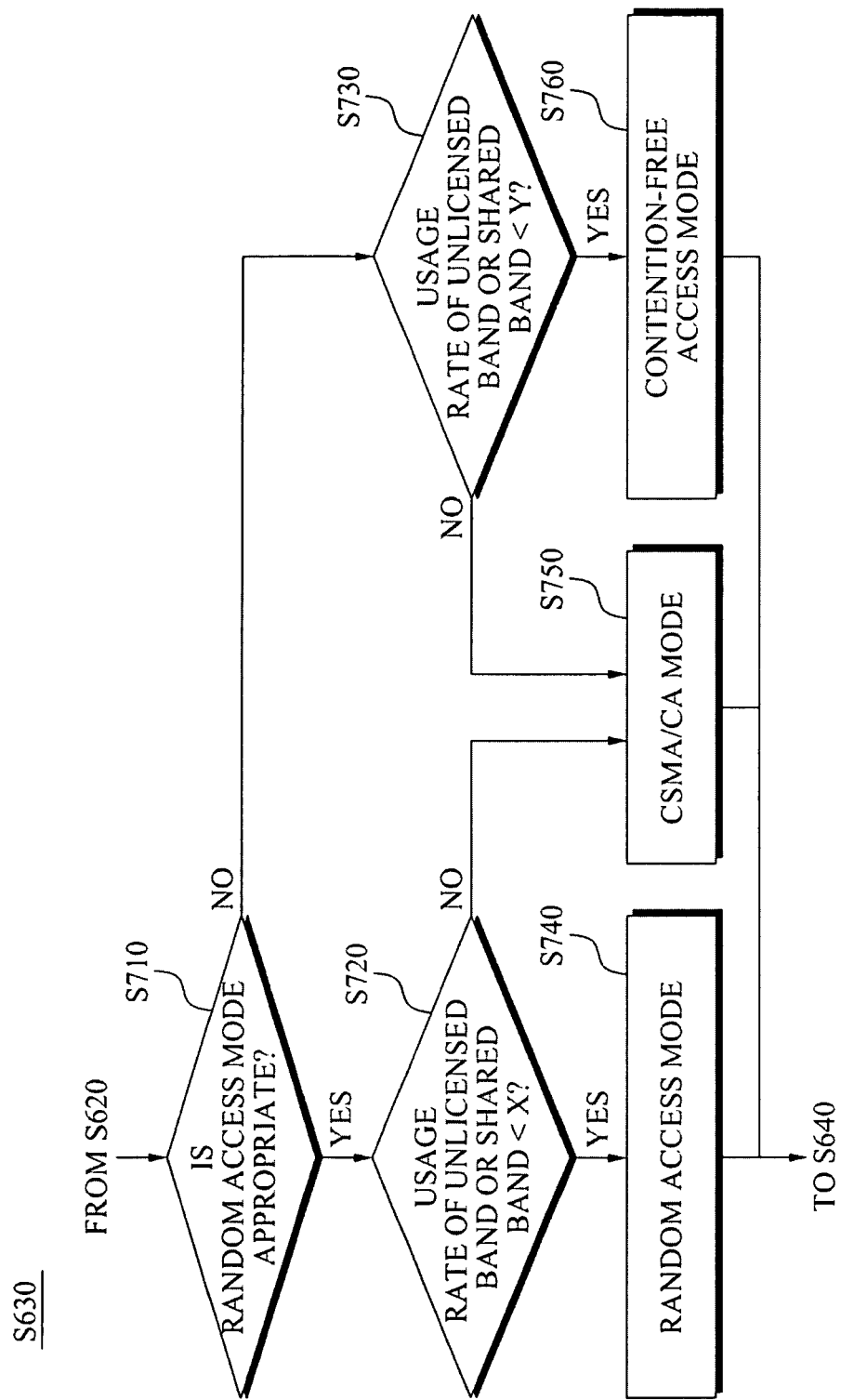
FIG. 7 is a flowchart illustrating an operation of determining an access mode shown in FIG. 6.

FIG. 7 is a flowchart of an example of operation S630 shown in FIG. 6. In operation S710, the access mode controlling apparatus determines whether the random access mode is appropriate for the access mode, based on one or more of a length of transmission data and a delay requirement.

In operation S720, when the random access mode is appropriate for the access mode, the access mode controlling apparatus compares the usage rate of the unlicensed band or the shared band with a reference value X. If the usage rate of the unlicensed band or the shared band is less than the reference value X, the access mode controlling apparatus determines the random access mode as the access mode in operation S740. If the random access mode is appropriate for the access mode but the usage rate of the unlicensed band or the shared band is greater than or equal to the reference value X, the access mode controlling apparatus may determine the CSMA/CA mode as the access mode in operation S750.

Conversely, when the random access mode is not appropriate for the access mode, the access mode controlling apparatus compares the usage rate of the unlicensed band or the shared band with a reference value Y in operation S730. If the usage rate of the unlicensed band the shared band is greater than or equal to the reference value Y, the access mode controlling apparatus determines the CSMA/CA mode as the access mode in order to avoid collision with the adjacent communication system and thereby improve the communication reliability in operation S750. If the usage rate of the unlicensed band or the shared band is less than the reference value Y, the access mode controlling apparatus determines the contention-free access mode as the access mode.

Matters shown in FIG. 7 but not described with reference to FIG. 7 have been described above with reference to FIGS. 1 through 6 and thus further description will be omitted. In addition, although not shown in FIG. 7, a process of operating a terminal device according to an aspect of the invention may include receiving mode information associated with an access mode from a base station, and communicating with the base station according to the access mode that is identified from the mode information.

The access mode controlling method and terminal device operating method according to aspects of the invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the invention.

Figure 8:
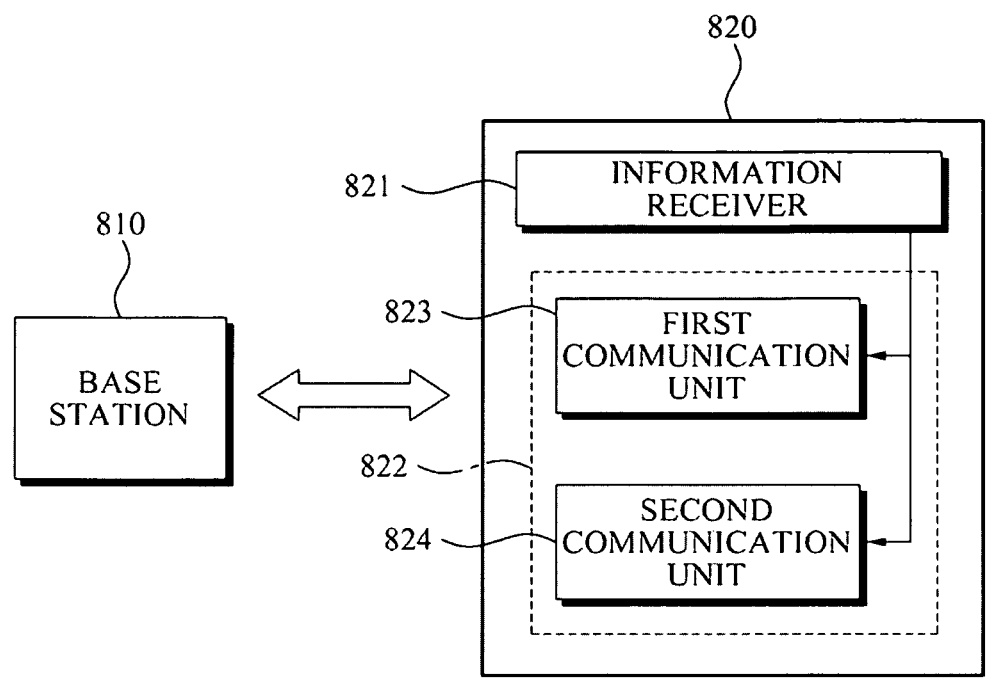
FIG. 8 illustrates a base station and a terminal device according to an embodiment of the invention.

FIG. 8 shows a base station 810 and a terminal device 820 according to an embodiment of the invention. The terminal device 820 includes an information receiver 821 and a communication performing unit 822. The communication performing unit 822 includes a first communication unit 823 and a second communication unit 824. The base station 810 may determine, as the access mode, any one of a contention access mode and a contention-free access mode, based on a usage rate of a shared band or an unlicensed band used by an adjacent communication system.

The information receiver 821 may receive mode information associated with an access mode from the base station 821. The terminal device 820 may identify the determined access mode from the mode information. The communication performing unit 822 may communicate with the base station 810 according to the identified access mode. The first communication unit 823 may communicate with the base station 810 according to the contention access mode. The second communication unit 824 may communicate with the base station 810 according to the contention-free access mode. Description not made with reference to FIG. 8 has been described above and thus further description will be omitted.

Although a few embodiments of the present invention have been shown and described, it would be appreciated by those skilled in the art that changes may be made to this embodiment without departing from the principles and spirit of the invention, the scope of which is defined by the claims and their equivalents.

What is claimed is:

1. An apparatus to control an access mode of a communication system that uses an unlicensed band or a shared band, the apparatus:
   recognizes a usage rate of the unlicensed band or the shared band that is used by an adjacent communication system of a target communication system;
   determines, as an access mode, any one of a contention access mode and a contention-free access mode, by comparing the usage rate of the unlicensed band or the shared band with a reference value; and
   transmits mode information associated with the determined access mode to member nodes or a base station of the target communication system;
   updates the usage rate of the unlicensed band or the shared band at least once in a time slot when the target communication system operates in the contention-free access mode or the contention access mode;
   determines whether to change the access mode based on the updated usage rate;
   determines whether a random access mode is appropriate for the access mode based on at least one of a length of a transmission message and a delay requirement of the transmission message; and
   determines, as the access mode, any one of the random access mode, a Carrier Sense Multiple Access/Collision Avoidance (CSMA/CA) mode, and the contention-free access mode based on the usage rate of the unlicensed band or the shared band.

2. The apparatus as claimed in claim 1, wherein the contention access mode comprises at least one of the random access mode and the CSMA/CA mode.

3. The apparatus as claimed in claim 1, wherein the member nodes communicate with the base station according to the determined access mode that is identified from the mode information.

4. The apparatus as claimed in claim 1, wherein the apparatus determines the access mode based on the length of a transmission message.

5. The apparatus as claimed in claim 1, wherein, when the base station of the target communication system performs receive beamforming, the apparatus determines the access mode based on an interference cancellation amount caused by the receive beamforming.

6. The apparatus as claimed in claim 1, wherein the apparatus detects an available band for the target communication system from the unlicensed band or the shared band.

7. The apparatus as claimed in claim 1, wherein the unlicensed band or the shared band comprises at least one band among a plurality of Industrial, Scientific, and Medical (ISM) bands.

8. A communication system to transmit and receive a signal generated according to a data frame, the system comprising:
   a base station that is configured to determine, as an access mode, any one of a contention access mode and a contention-free access mode, by comparing a usage rate of a shared band or an unlicensed band used by an adjacent communication system with a reference value, the base station comprising an information transmitter that is configured to transmit mode information associated with the determined access mode to member nodes or a base station of a target communication system, wherein:
   the data frame comprises:
      a contention access slot that is a time slot where the communication system performs communication according to the contention access mode; and
      a contention-free access slot that is a time slot where the communication system performs communication according to the contention-free access mode,
   the base station updates the usage rate of the unlicensed band or the shared band at least once in a time slot when the target communication system operates in the contention-free access mode or the contention access mode,
   the base station determines whether to change the access mode based on the updated usage rate, and
   the base station:
      determines whether a random access mode is appropriate for the access mode based on at least one of a length of a transmission message and a delay requirement of the transmission message, and
      determines, as the access mode, any one of the random access mode, a Carrier Sense Multiple Access/Collision Avoidance (CSMA/CA) mode, and the contention-free access mode based on the usage rate of the unlicensed band or the shared band.

9. The communication system as claimed in claim 8, wherein, when the access mode is changed, the base station transmits mode information associated with the changed access mode to member nodes of the target communication system during a portion of the time slot of the contention access slot or the contention-free access slot.

10. The communication system as claimed in claim 8, wherein, in the contention-free access slot and the contention access slot, the base station updates the usage rate of the unlicensed band or the shared band at least once and determines whether to change the access mode based on the updated usage rate.

11. The communication system as claimed in claim 8, wherein the contention access mode comprises at least one of the random access mode and the Carrier Sense Multiple Access/Collision Avoidance (CSMA/CA) mode.

12. A communication system comprising:
   a base station; and
   a terminal device comprising an information receiver that is configured to receive mode information associated with an access mode from the base station; wherein the terminal device communicates with the base station according to the access mode that is identified from the mode information, wherein:
   the base station determines, as the access mode, any one of a contention access mode and a contention-free access mode, by comparing a length of a transmission message that corresponds to a usage rate of a shared band or an unlicensed band used by an adjacent communication system with a reference value,
   the base station updates the usage rate of the unlicensed band or the shared band at least once in a time slot when a target communication system operates in the contention-free access mode or the contention access mode,
   the base station determines whether to change the access mode based on the updated usage rate, and
   the base station:
      determines whether a random access mode is appropriate for the access mode based on at least one of the length of the transmission message and a delay requirement of the transmission message, and
      determines, as the access mode, any one of the random access mode, a Carrier Sense Multiple Access/Collision Avoidance (CSMA/CA) mode, and the contention-free access mode based on the usage rate of the unlicensed band or the shared band.

13. The terminal device as claimed in claim 12, wherein the terminal device:
   communicates with the base station according to the contention access mode; and
   communicates with the base station according to the contention-free access mode.

14. The terminal device as claimed in claim 12, wherein the contention access mode comprises at least one of the random access mode and the CSMA/CA mode.

15. The terminal device as claimed in claim 12, wherein the information receiver receives mode information associated with the changed access mode from the base station.

16. A method by which a base station controls an access mode, the method comprising:
   recognizing a usage rate of an unlicensed band or a shared band that is used by an adjacent communication system of a target communication system;
   determining, as an access mode, any one of a contention access mode and a contention-free access mode, by comparing the usage rate of the unlicensed band or the shared band with a reference value; and
   transmitting mode information associated with the determined access mode to member nodes or a base station of the target communication system so as to control the access mode of the target communication system, wherein:
   the base station updates the usage rate of the unlicensed band or the shared band at least once in a time slot when the target communication system operates in the contention-free access mode or the contention access mode,
   the base station determines whether to change the access mode based on the updated usage rate, and
   the base station:
      determines whether a random access mode is appropriate for the access mode based on at least one of a length of a transmission message and a delay requirement of the transmission message, and
      determines, as the access mode, any one of the random access mode, a Carrier Sense Multiple Access/Collision Avoidance (CSMA/CA) mode, and the contention-free access mode based on the usage rate of the unlicensed band or the shared band.

17. A non-transitory computer-readable recording medium storing a program to implement the method of claim 16.

18. A method of operating a communication system comprising a base station and a terminal device, the method comprising:
   receiving mode information associated with an access mode from the base station; and
   communicating with the base station according to the access mode that is identified from the mode information, wherein:

the base station determines, as the access mode, any one of
a contention access mode and a contention-free access
mode, by comparing a usage rate of a shared band or an
unlicensed band used by an adjacent communication
system with a reference value, the base station updates the usage rate of the unlicensed
band or the shared band at least once in a time slot when
the target communication system operates in the contention-free access mode or the contention access mode, the base station determines whether to change the access
mode based on the updated usage rate, and the base station:
- determines whether a random access mode is appropriate for the access mode based on at least one of a length of a transmission message and a delay requirement of the transmission message, and
- determines, as the access mode, any one of the random access mode, a Carrier Sense Multiple Access/Collision Avoidance (CSMA/CA) mode, and the contention-free access mode based on the usage rate of the unlicensed band or the shared band.

19. The method as claimed in claim 18, wherein the receiving of the mode information comprises receiving the mode information associated with the changed access mode from the base station.

* * * * *